United States Patent [19]

Ratelband

[11] Patent Number: 5,090,660
[45] Date of Patent: Feb. 25, 1992

[54] DIAPHRAGM VALVE COMPRISING A SLEEVE-SHAPED ELASTIC DIAPHRAGM

[76] Inventor: Johannes B. Ratelband, Eusebiusbinnensingel 5-3, NL-6811 BW, Arnhem, Netherlands

[21] Appl. No.: 626,576

[22] Filed: Dec. 10, 1990

[30] Foreign Application Priority Data

Dec. 11, 1989 [NL] Netherlands ............ 8903042

[51] Int. Cl.$^5$ ............................................. F16K 07/07
[52] U.S. Cl. ................................................. 251/61.1
[58] Field of Search ................ 251/5, 61.1, 147, 331

[56] References Cited

U.S. PATENT DOCUMENTS

| 3,060,966 | 10/1962 | Ratelband | 251/61.1 X |
| 3,556,465 | 1/1971 | Little | 251/61.1 |
| 4,403,660 | 9/1983 | Coone | 166/387 |

FOREIGN PATENT DOCUMENTS

| 0175028 | 3/1986 | European Pat. Off. | 251/61.1 |
| 1595857 | 7/1970 | France . | |
| 2264230 | 10/1975 | France . | |
| 678318 | 9/1952 | United Kingdom . | |

Primary Examiner—Martin P. Schwadron
Assistant Examiner—Kevin L. Lee
Attorney, Agent, or Firm—Wells, St. John & Roberts

[57] ABSTRACT

A diaphragm valve comprises a housing (1) provided with a supply and a discharge opening, and adapted to be inserted in a conduit. A sleeve-shaped elastic diaphragm (4) is accomodated in the housing (1), and extends between the openings. The diaphragm (4) is adapted to be loaded from the outside by a pressure fluid. In its unloaded condition, the diaphragm (4) is at a radial distance from a core body (5) located centrally therein, and the valve is open. In its fully loaded condition, a middle section (11) of the diaphragm (4) is pressed against the core body (5), and the valve is closed. The wall of the resilient diaphragm has means (10) for increasing its stiffness. These means (10) only extend from an end of the diaphragm (4) to a place near its middle section (11), thus simplifying manufacture of the diaphragm (4) and improving its sealing.

4 Claims, 1 Drawing Sheet

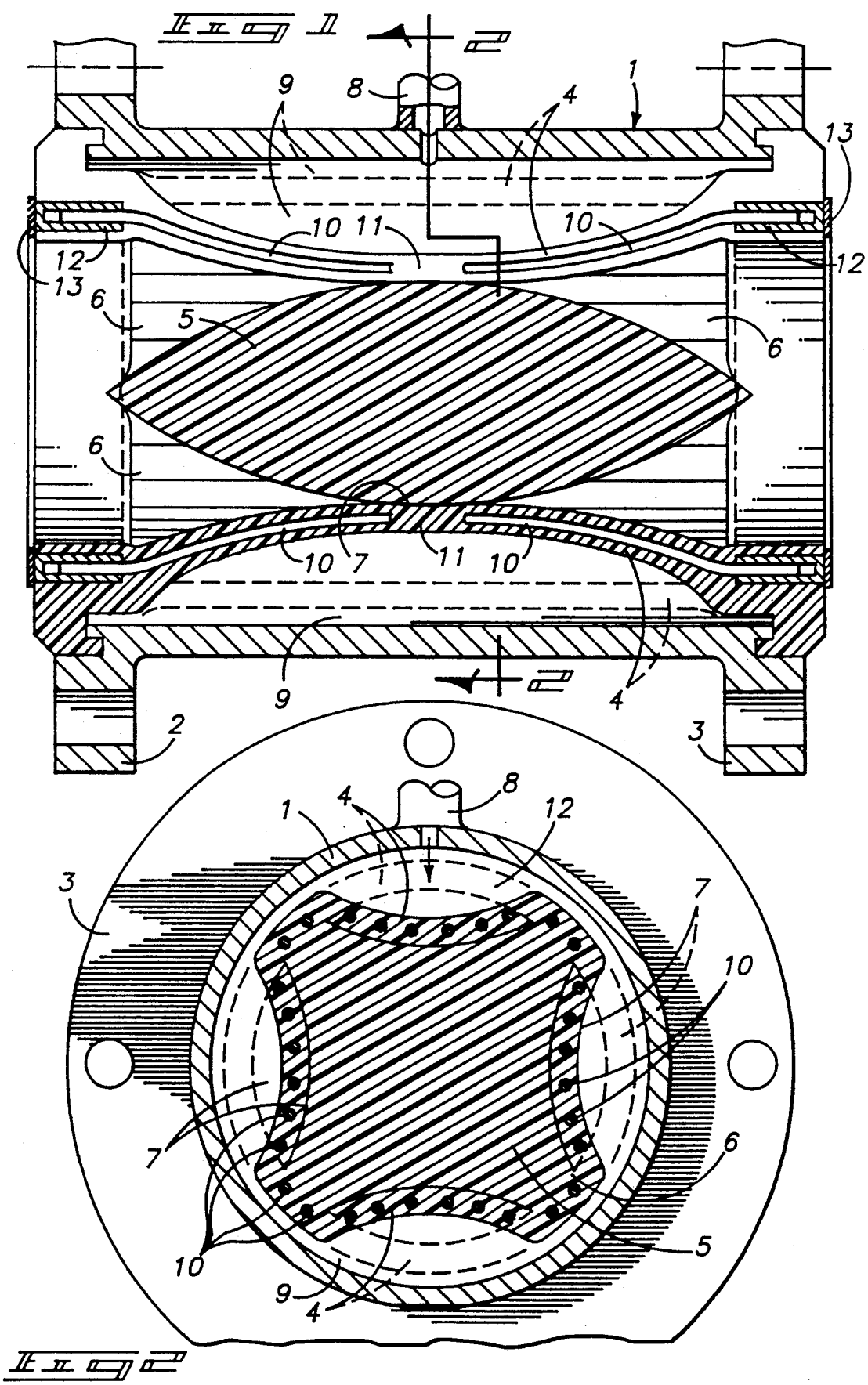

DIAPHRAGM VALVE COMPRISING A SLEEVE-SHAPED ELASTIC DIAPHRAGM

The invention relates to a diaphragm valve comprising a housing provided with a supply and a discharge opening and adapted to be inserted in a conduit, a sleeve-shaped elastic diaphragm accomodated in said housing extending between said openings and adapted to be transversely loaded from the outside by a pressure fluid, the wall of said resilient diaphragm having means to increase the stiffness thereof, said valve having in addition a core body located centrally in the diaphragm and the latter defining together with said core body the passage through the valve, extending in its unloaded condition at a radial distance from the core body to keep said passage open, but being pressed in its fully loaded condition with a longitudinal middle section against the core body to keep said passage closed.

A diaphragm valve of this type has been disclosed in the French patent specification 1.595.857. Used in this known valve is, for the purpose to increase the stiffness of the resilient diaphragm, an intermediate layer of intersecting, about the axis of the diaphragm helically wound wires, which extend from one end of the diaphragm to the other end thereof and are firmly secured, mostly by a vulcanization-process, to the elastic material of the diaphragm throughout their entire length.

This construction of the diaphragm, which usually consists of vulcanized natural or synthetic rubber, has several disadvantages. For instance, the manufacture of the diaphragm asks for a building-up in different layers which requires several stages of vulcanization. Furthermore, there will be induced, due to the firm anchoring of the long wires in the elastic material of the diaphragm, when the diaphragm is bent towards the core body, between said material and said wires shear stresses which in the long run may lead to the appearance of cracks. Moreover, the web of wires appears to hamper the compression in circumferential direction of the elastic material in the longitudinal middle section so much that a reliable seal is only obtained, when the pressure fluid has a relatively high overpressure.

The invention has the object to provide a diaphragm valve of the afore described kind, in which the disadvantages of the known valve are substantially overcome and in addition advantages as described below are gained. In accordance with the invention this is achieved in that the means to increase the stiffness of the diaphragm are fabric or canvass layers, bars of spring steel, resilient synthetic material or comparable material which extend only from an end of the diaphragm to a place near the longitudinal middle section of the diaphragm, with which the latter, when fully loaded by the pressure fluid, is pressed against the core body. In this case the longitudinal section of the diaphragm for closing the valve remains free from means for stiffening the diaphragm, therefore very flexible as well as easily compressible in circumferential direction, so that also at lower overpressures of the pressure fluid a reliable seal is guaranteed. The stiffness of the diaphragm increasing means which are not half so long as the usual means induce, even if they are firmly vulcanized to the elastic material of the diaphragm, considerably lower shear stresses in the diaphragm during bending thereof, so that the risk of cracking said material is also much smaller. To manufacture the diaphragm mostly a vulcanization process one only will do. An additional advantage of the shorter means to increase the stiffness of the diaphragm is that during the bending of the diaphragm towards the core body the longitudinal middle section of the diaphragm is at the same time circumferentially compressed and longitudinally stretched by the inward movement of said means, so that the tendency of said section to decrease its inner diameter is increased and, consequently, the sealing pressure between the diaphragm and the core body is also increased.

In many cases it suffices to locate the layers of fabric or canvass or the bars only in the downstream portion of the diaphragm. Only in that portion of the diaphragm the danger is great that the diaphragm is unacceptably deformed by the great difference between the pressure of the pressure fluid acting on one side and that of the fluid in the cut off down stream portion of the valve passage acting on the other side of the diaphragm.

It appears to be advantageous when the means increasing the stiffness of the resilient diaphragm are bars which extend each with their end portion remote from the said longitudinal middle section of the diaphragm in a boring or a groove of a supporting ring provided at the relevant end of the diaphragm and preventing said end portion to tilt at least in radial direction, when the diaphragm is loaded and thereby bent onto the core body. This avoids the risk that said end portions of the stiffness increasing means tilt and both stretches and compresses the elastic material of the diaphragm locally in a very unfavourable way.

Furthermore, it is recommended to so construct the diaphragm valve that, when the stiffness increasing means are bars, the latter extend free to move in fitting cavities which are formed in the elastic material of the diaphragm. In that case there will hardly be induced shear stresses between said means and said bars, when the diaphragm is bent.

The above mentioned and other features of the invention will be elucidated with the aid of the description of an embodiment shown in the accompanying drawings. In the drawings:

FIG. 1 is a longitudinal sectional view of a diaphragm valve according to the invention and illustrates in full lines the closed condition and in dash lines the open condition of the valve, and FIG. 2 is a cross sectional view taken along the line II—II in FIG. 1.

In the drawing a cylindric housing is indicated by 1 which has flanges 2 and 3 for the connection of the valve to conduits for the transport of a fluid, e.g. water or air, or an other fluid. In the housing a body of elastic material, e.g. natural or synthetic rubber or an other elastic synthetic material, is accomodated and fastened in the housing by clamping. Said body consists of a diaphragm 4 which is cylindric when it is in its unloaded condition, a core body 5 located centrally in the diaphragm and longitudinal ribs 6 which interconnect the diaphragm and the core body locally and divide, when the diaphragm is in its unloaded condition, the then open passage through the valve into separate longitudinal passages 7, which during loading of the diaphragm are each closed by an individual portion of the diaphragm. The pressure fluid for loading the diaphragm is supplied through the connecting nipple 8 into the cavity 9 located between the housing 1 and the diaphragm 4. A diaphragm valve having a plurality of separate passages has been described in the Dutch patent specification 99179. The valve constructed in accordance with the invention differs from this known valve by the features which will be elucidated hereinafter.

For the purpose of increasing the stiffness of the diaphragm 4 in order to prevent the deformation of the loaded diaphragm 4, even at considerably higher pressures than the usual ones of about 3 ato of the pressure fluid and that of the fluid controlled by the valve, from deviating from the arc illustrated in the drawings, longitudinal bars 10 of spring steel, resilient synthetic material or comparable material are, according to the invention, embedded in a concentric layer of the diaphragm. However, these bars extend only from an end of the diaphragm to a place near the longitudinal middle section 11 of the diaphragm 4 which in the closed condition of the valve is pressed against the core body 5 and keeps the valve closed. This has the advantage that the longitudinal middle section of the diaphragm remains supple and for the adjustment of its inner surface to the outer surface of the core body not only is compressed in circumferential direction but also longitudinally stretched by the bending of the bars towards the core body, when it is forced inwards by the pressure of the pressure fluid. Due thereto a better seal is guaranteed and the controllability of the diaphragm appears to be more reliable. Moreover, the diaphragm may be controlled by pressure fluid of lower pressure than usual.

The longitudinal bars 10 are each inserted with their end portion near the end of the diaphragm in a circular groove of a supporting ring 12 having a cross sectional area in the shape of a lying U and being embedded in an end of the body 4,5,6 of elastic material. This ring prevents the said end portions of the bars from radially tilting in the elastic material of said body 4,5,6, whereby said material is both locally compressed and stretched, when the diaphragm 4 is bent towards the core body 5, which appears in the long run to be detrimental for the portion of the body 4,5,6 near the flanges thereof.

Although the bars 10 extend only between the ends of the diaphragm 4 and the middle section 11 thereof they appear to prevent the diaphragm from undesired deformation even under extreme conditions and the then induced maximum pressure differences acting on the flexible diaphragm. That is why in several cases it suffices to use said bars only in the down stream part of the diaphragm, in which said maximum pressure differences occur, when the valve is in its closed condition.

It will be obvious that the supporting rings 12 may have a circular row of borings instead of the circular groove, in which the end portions of the bars 10 are inserted.

The cavities for the supporting rings 12 at the ends of the body 4,5,6 are sealed by sealing rings 13, which may be held down by the flange connections of the valve.

The relatively short bars 10 can be easily inserted in fitting cavities of the diaphragm which are previously formed therein. In that case said bars are not secured to the elastic material of the diaphragm by vulcanization or other process but remain free to move in said cavities when the diaphragm is bent. The risk of cracking the elastic material of the diaphragm by shear stresses is then very small. The cavities for the longidudinal bars 10 and the supporting rings 12 may be formed in the elastic material of the body 4,5,6 by means of inserts of the required shape and size placed in the mould to form said body and which do not adhere to the elastic material, so that said inserts can be removed from said body after the latter has been completed and, if required, vulcanized to make place for said bars and supporting rings.

I claim:

1. A diaphragm valve comprising:

an elongated housing (1) extending along a central axis provided with axially spaced supply and discharge openings and adapted to be inserted in a conduit;

an annular sleeve-shaped resilient diaphragm (4) having a wall in said housing, extending axially from opposed ends at said supply and discharge openings to a longitudinal middle section adapted to be transversely loaded from outside said wall by a pressure fluid to a transversely contracted loaded condition, from an unloaded condition;

a core body (5) located centrally in the diaphragm (4) and defining together with said diaphragm wall an axial passage through the valve, extending in the unloaded condition axially through the valve but being transversely pressed by the longitudinal middle section (11) against the core body (5) to close said passage in the loaded condition; and the wall of said resilient diaphragm having a reinforcement means for increasing stiffness of the diaphragm, said means extending axially along the diaphragm to a place near the longitudinal middle section (11) of the diaphragm (4) leaving the middle section without reinforcement such that the longitudinal middle section (11) when fully loaded, is pressed against the core body (5) to close the valve.

2. The diaphragm valve of claim 1 wherein the reinforcement means is located only at one end of the diaphragm.

3. The diaphragm valve of claim 1 wherein the reinforcement means is comprised of bars (10) which extend each from an end portion mounted to a supporting ring (12) provided at an end of the diaphragm, said ring preventing said end portion to tilt at least in radial direction, when the diaphragm is loaded.

4. The diaphragm valve of claim 1 wherein the reinforcement means is comprised of an elongated bar (10) with an axial dimension received by and axially movable within a cavity formed in the diaphragm, said cavity having axial dimension greater than the axial dimension of the bar.

* * * * *